(12) United States Patent
Godowski et al.

(10) Patent No.: US 11,416,583 B2
(45) Date of Patent: Aug. 16, 2022

(54) DETERMINING SOFTWARE APPLICATION LICENSE USAGE

(71) Applicant: INTERNATIONAL BUSINESS MACHINES CORPORATION, Armonk, NY (US)

(72) Inventors: Piotr P. Godowski, Cracow (PL); Szymon Kowalczyk, Cracow (PL); Andrzej Pietrzak, Cracow (PL); Michal Paluch, Cracow (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 274 days.

(21) Appl. No.: 16/870,312

(22) Filed: May 8, 2020

(65) Prior Publication Data

US 2021/0349973 A1 Nov. 11, 2021

(51) Int. Cl.
*G06F 21/00* (2013.01)
*G06F 21/10* (2013.01)
(Continued)

(52) U.S. Cl.
CPC .......... *G06F 21/105* (2013.01); *G06F 16/245* (2019.01); *G06F 21/12* (2013.01);
(Continued)

(58) Field of Classification Search
CPC ...... G06F 21/105; G06F 16/245; G06F 21/12; G06F 2221/0713; G06Q 10/10; H04L 63/104
See application file for complete search history.

(56) References Cited

U.S. PATENT DOCUMENTS 8,725,647 B2   5/2014  Disciascio et al.
11,086,827 B1*  8/2021  Sainanee ............... G06F 16/211
(Continued)

FOREIGN PATENT DOCUMENTS

JP      2016095748 A    5/2016

OTHER PUBLICATIONS

English translation of JP2016095748A dated May 26, 2016, pp. 21.
(Continued)

*Primary Examiner* — Kendall Dolly
(74) *Attorney, Agent, or Firm* — Konrad, Raynes, Davda & Victor LLP; Janaki K. Davda

(57) ABSTRACT

Provided are techniques for automated software application license usage. Global detection results that indicate, for each of a plurality of end user computers, one or more installed software applications, one or more running software applications, and a user account. Unique pairs are identified using the global detection results, wherein each pair of the unique pairs comprises a software application name for a software application and a user name for a user. For a unique pair, a query is run against a user registry to get a list of user groups that the user name is a member of, a user group is selected that corresponds to the software application name, and a number of users in the selected user group is designated as a license demand for authorized users for the software application. Then, based on the global detection results and the license demand, one or more recommendations are provided.

18 Claims, 7 Drawing Sheets

(51) Int. Cl.
  *G06Q 10/10* (2012.01)
  *G06F 16/245* (2019.01)
  *H04L 9/40* (2022.01)
  *G06F 21/12* (2013.01)

(52) U.S. Cl.
  CPC .......... *G06Q 10/10* (2013.01); *H04L 63/104* (2013.01); *G06F 2221/0713* (2013.01)

(56) References Cited

U.S. PATENT DOCUMENTS

| | | |
|---|---|---|
| 2013/0144742 A1 | 6/2013 | Thakur et al. |
| 2017/0308367 A1* | 10/2017 | Clothier .................... G06F 8/61 |
| 2019/0163456 A1* | 5/2019 | Borthakur ............. G06F 21/105 |
| 2021/0026851 A1* | 1/2021 | Kaul ................. G06F 16/24535 |
| 2021/0182249 A1* | 6/2021 | Dickson ................ G06F 16/252 |
| 2021/0203739 A1* | 7/2021 | Calegari ................. G06F 9/547 |

OTHER PUBLICATIONS

"Snow License Manager", Snow, pp. 1, [online][retrieved Apr. 28, 2020], Apr. 28, 2020 https://www.snowsoftware.com/int/products/snow-license-manager.

"Snow Inventory", Snow, pp. 2, [online][retrieved Apr. 28, 2020], Apr. 28, 2020 https://www.snowsoftware.com/int/products/snow-inventory.

\* cited by examiner

DETERMINING SOFTWARE APPLICATION LICENSE USAGE

BACKGROUND

Embodiments of the invention relate to automated software application license usage. In particular, embodiments of the invention relate to automated software application license usage counting for authorized users based on user group membership.

Currently, there are multiple types of software application licenses for different types of software applications, such as install-based, Central Processing Unit (CPU) capacity-based or user-based. Determining software application license usage is not solved universally currently on the marketplace. In addition, most of the existing solutions on the marketplace require manual data gathering and manual data reconciliation.

SUMMARY

In accordance with certain embodiments, a computer-implemented method is provided for automated software application license usage. The computer-implemented method comprises operations. Global detection results that indicate, for each of a plurality of end user computers, one or more installed software applications, one or more running software applications, and a user account that is executing each of the running software applications are stored. Unique pairs are identified using the global detection results, wherein each pair of the unique pairs comprises a software application name for a software application and a user name for a user. For a unique pair of the unique pairs, query is run against a user registry to get a list of user groups that the user name is a member of, a user group is selected from the list of user groups that corresponds to the software application name, and a number of users in the selected user group is designated as a license demand for authorized users for the software application. Then, based on the global detection results and the license demand, one or more recommendations are provided.

In accordance with other embodiments, a computer program product is provided for automated software application license usage. The computer program product comprises a computer readable storage medium having program code embodied therewith, the program code executable by at least one processor to perform operations. Global detection results that indicate, for each of a plurality of end user computers, one or more installed software applications, one or more running software applications, and a user account that is executing each of the running software applications are stored. Unique pairs are identified using the global detection results, wherein each pair of the unique pairs comprises a software application name for a software application and a user name for a user. For a unique pair of the unique pairs, query is run against a user registry to get a list of user groups that the user name is a member of, a user group is selected from the list of user groups that corresponds to the software application name, and a number of users in the selected user group is designated as a license demand for authorized users for the software application. Then, based on the global detection results and the license demand, one or more recommendations are provided.

In accordance with yet other embodiments, a computer system is provided for automated software application license usage. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Global detection results that indicate, for each of a plurality of end user computers, one or more installed software applications, one or more running software applications, and a user account that is executing each of the running software applications are stored. Unique pairs are identified using the global detection results, wherein each pair of the unique pairs comprises a software application name for a software application and a user name for a user. For a unique pair of the unique pairs, query is run against a user registry to get a list of user groups that the user name is a member of, a user group is selected from the list of user groups that corresponds to the software application name, and a number of users in the selected user group is designated as a license demand for authorized users for the software application. Then, based on the global detection results and the license demand, one or more recommendations are provided.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the Software Asset Management (SAM) space, embodiments provide software application discovery and software application usage (i.e., utilization) license reporting. Embodiments identify different types of software application licenses for different types of software, such as install-based, CPU capacity-based or user-based. Although identifying CPU capacity-based or user-based software application licenses may be challenging, embodiments understand the number of users accessing or having potential to access software. Software may also be referred to as software programs or software.

Embodiments provide accurate software application usage license reporting by correlating various elements together: software discovery, running software applications and their user accounts, and user registries (e.g., Lightweight Directory Access Protocol (LDAP) user registries or other user registries). Embodiments eliminate manual data reconciliation and gathering, while providing an automated technique for the correlation.

Figure 1:
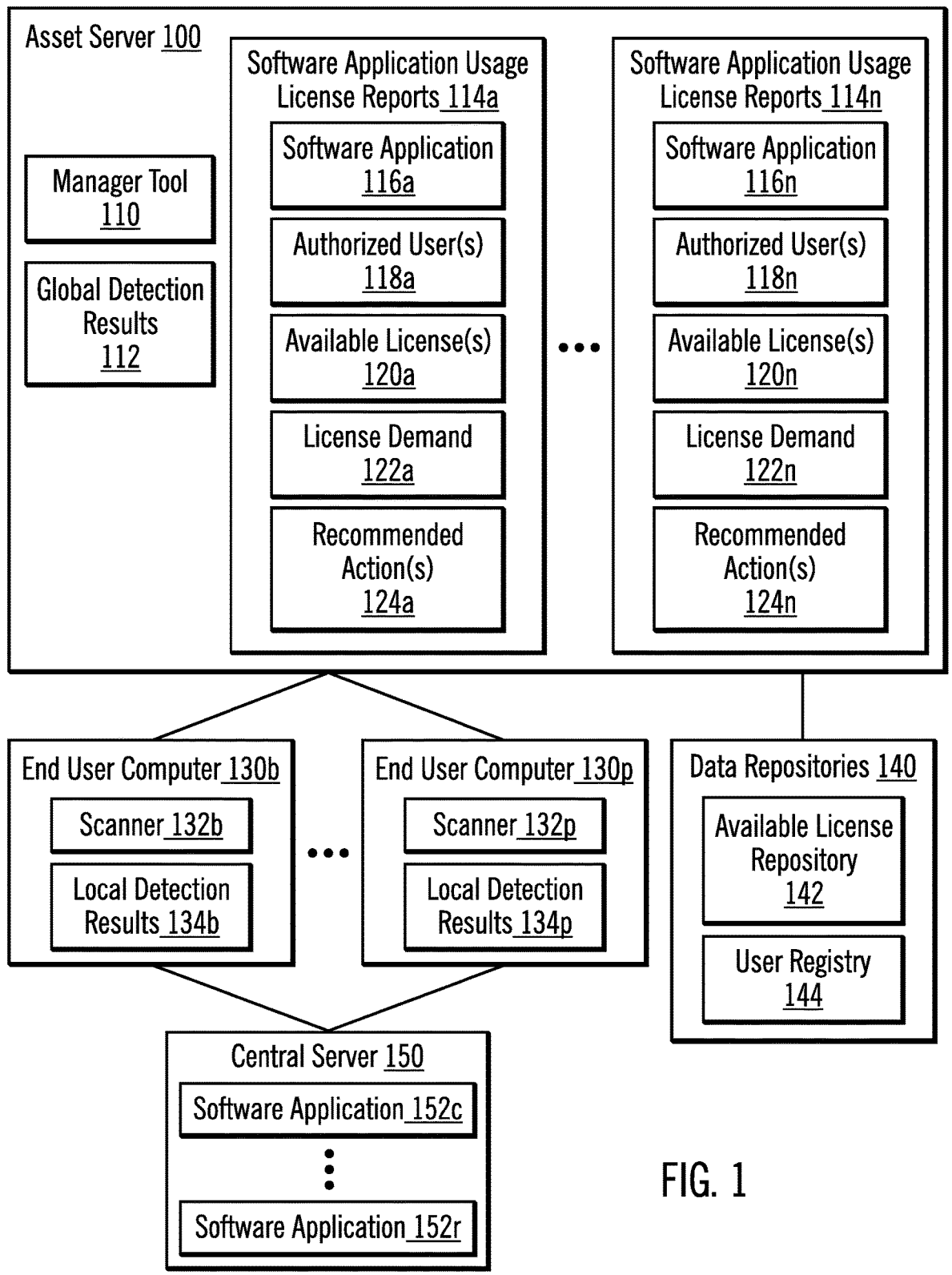
FIG. 1 illustrates, in a block diagram, a computing environment in accordance with certain embodiments.

FIG. 1 illustrates, in a block diagram, a computing environment in accordance with certain embodiments. An asset server 100 includes a manager tool 110, global detection results 112, and one or more software application usage license reports 114a . . . 114n. In certain embodiments, the manager tool 110 is a software asset manager tool. Each software application usage license report 114a . . . 114n identifies a software application 116a . . . 116n, one or more authorized users 118a . . . 118n for the software application 116a . . . 116n, available licenses 120a . . . 120n for the software application 116a . . . 116n, a license demand 122a . . . 122n for the software application, and one or more recommended actions 124a . . . 124n. For example, the recommended actions 124a . . . 124n may include any combination of: optimizing the user group membership to remove users from user groups who do not use the software application, transferring a license from one user who is not running the software application to another user who does run that software application, purchasing additional software application licenses, and/or renewing fewer licenses (e.g., to save money if fewer users are running those software applications). Also, each software application usage license report 114a . . . 114n may be generated for a subset of the end user computers 130b . . . 130p.

The asset server 100 is connected to data repositories 140. The data repositories 140 include an available license repository 142 and at least one user registry 144. In certain embodiments, there are one or more user registries, LDAP user registries, and other user registries that manage permissions and access to networked resources. In certain embodiments, each user belongs to one or more user groups, such as a spreadsheet user group, a text document user group, an administrators user group, a developers user group, a region A user groups, a country Y user group, etc.

The asset server is connected to end user computers 130b . . . 130p. Each end user computer 130b . . . 130p includes a scanner 132b . . . 132p and local detection results 134b . . . 134p. Each scanner 132b . . . 132p detects what software is installed (e.g., spreadsheet software application or text editing software application) and which users are using the software on that end user computer 130b . . . 130p.

Each of the end user computers 130b . . . 130p is connected to a central server 150 that stores software applications 152c . . . 152r. The software applications 152c . . . 152r may be described as multi-user access software applications. These are software applications 152c . . . 152r that are on the central server 150 and are accessed and shared by users using the end user computers 130b . . . 130p.

Figure 2:
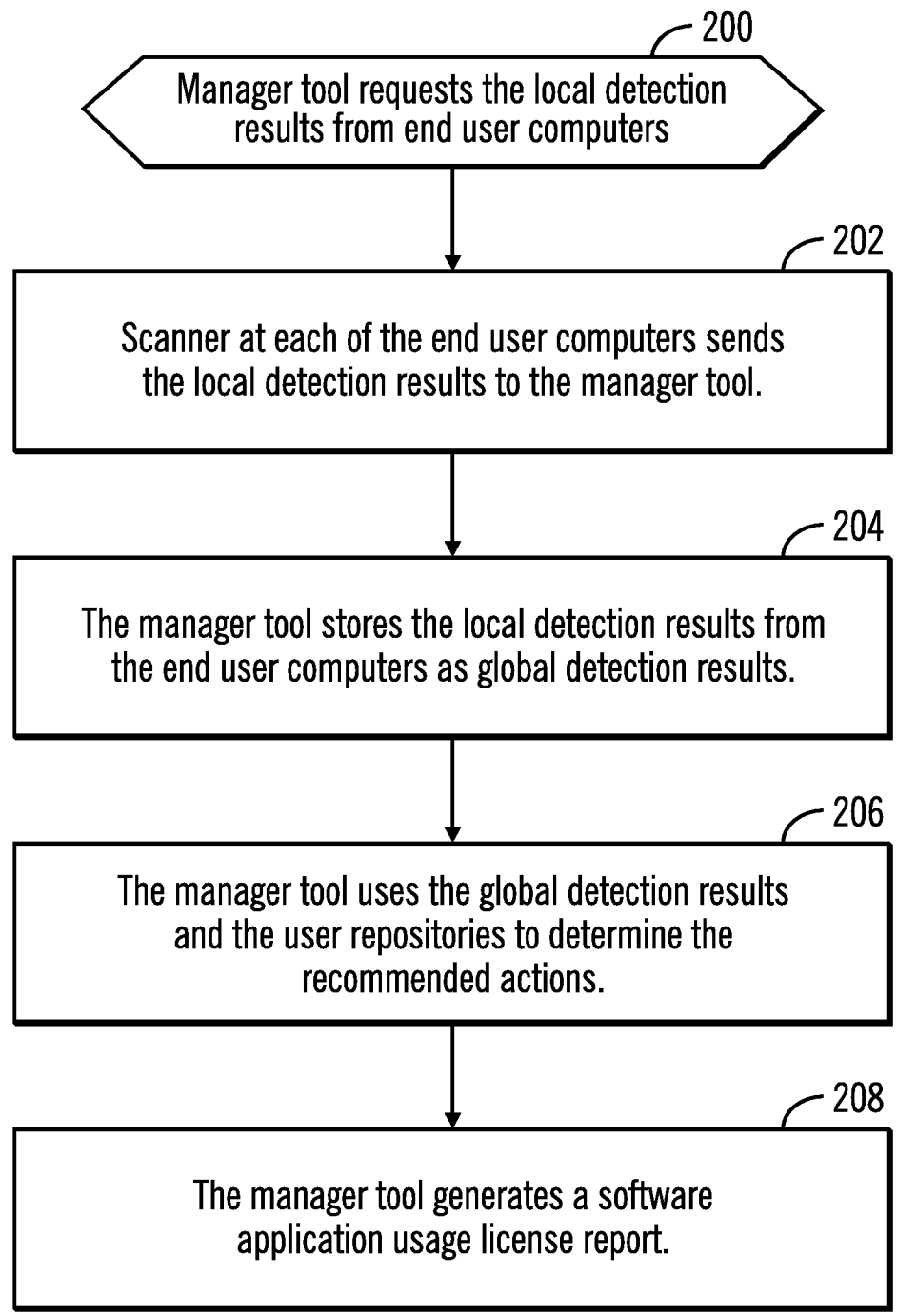
FIG. 2 illustrates, in a flowchart, operations for generating a software application usage license report in accordance with certain embodiments.

FIG. 2 illustrates, in a flowchart, operations for generating a software application usage license report 114a . . . 114n in accordance with certain embodiments. Control begins at block 200 with the manager tool 110 requesting local detection results 134b . . . 134p from end user computers 130b . . . 130n. In certain embodiments, the request goes to a subset of the end user computers 130b . . . 130n (e.g., to end user computers 130b . . . 130n used by human resources).

In block 202, the scanner 132b . . . 132p at each of the end user computers 130b . . . 130p sends the local detection results 134b . . . 134p to the manager tool 110. In block 204, the manager tool 110 stores the local detection results 134b . . . 134p from the end user computers 130b . . . 130p as global detection results 112. In certain embodiments, the global detection results 112 indicates, for each end user computer 130b . . . 134p, one or more installed software applications, one or more running software applications, and a user account that is executing each of the running software applications. That is, the global detection results 112 includes the information in the different local detection results 134b . . . 134p. In block 206, the manager tool 110 uses the global detection results 112 and the data repositories 140 (i.e., the available license repository 142 and at least one user registry 144) to determine recommended actions 124a . . . 124n. In block 208, the manager tool 110 generates a software application usage license report 114a . . . 114n.

The manager tool 110 provides accurate software application usage license reports 114a . . . 114n by correlating various elements together: software discovery, running software applications and their user accounts, and at least one user registry 144 (e.g., LDAP user registries or other user registries). With embodiments, the user-based license demand is not derived from the actual users using the software, but from users who have installed the software and/or have the capability to run the software. Many enterprises use registries to group users together into user group (e.g., LDAP user group). However, the user groups are not associated with software applications.

With embodiments, the manager 110 collects information about the discovered software applications on the scanned end user computers 130a . . . 130n, as well as, the information about the running software applications. That is, the local detection results 134b . . . 134p identify the running software applications and which user account runs each of the software applications. Such information is uploaded to the central asset server 100 for storage as global detection results 112.

The manager tool 110 connects to the data repositories 140 (e.g., to the user registry 144 (such as an LDAP user registry or enterprise user registry)) to understand the group membership of each user's account (i.e., each user account). Based on the software application name, the manager tool finds the closest matching user name from the list of the discovered user groups. In certain embodiments, the matching is exact matching, while in other embodiments, the matching is fuzzy matching (e.g., based on string comparison and distance between the software application name and the user group name).

In certain embodiments, the license demand for the software application is counted as the total number of users belonging to the same user group as the user who was found to have installed the software application or was found to have run the software application. The license demand may be described as the number of licenses for a software application that should be obtained for authorized users, and the authorized users may be described as the users (i.e., members) of the identified user group.

Figure 3:
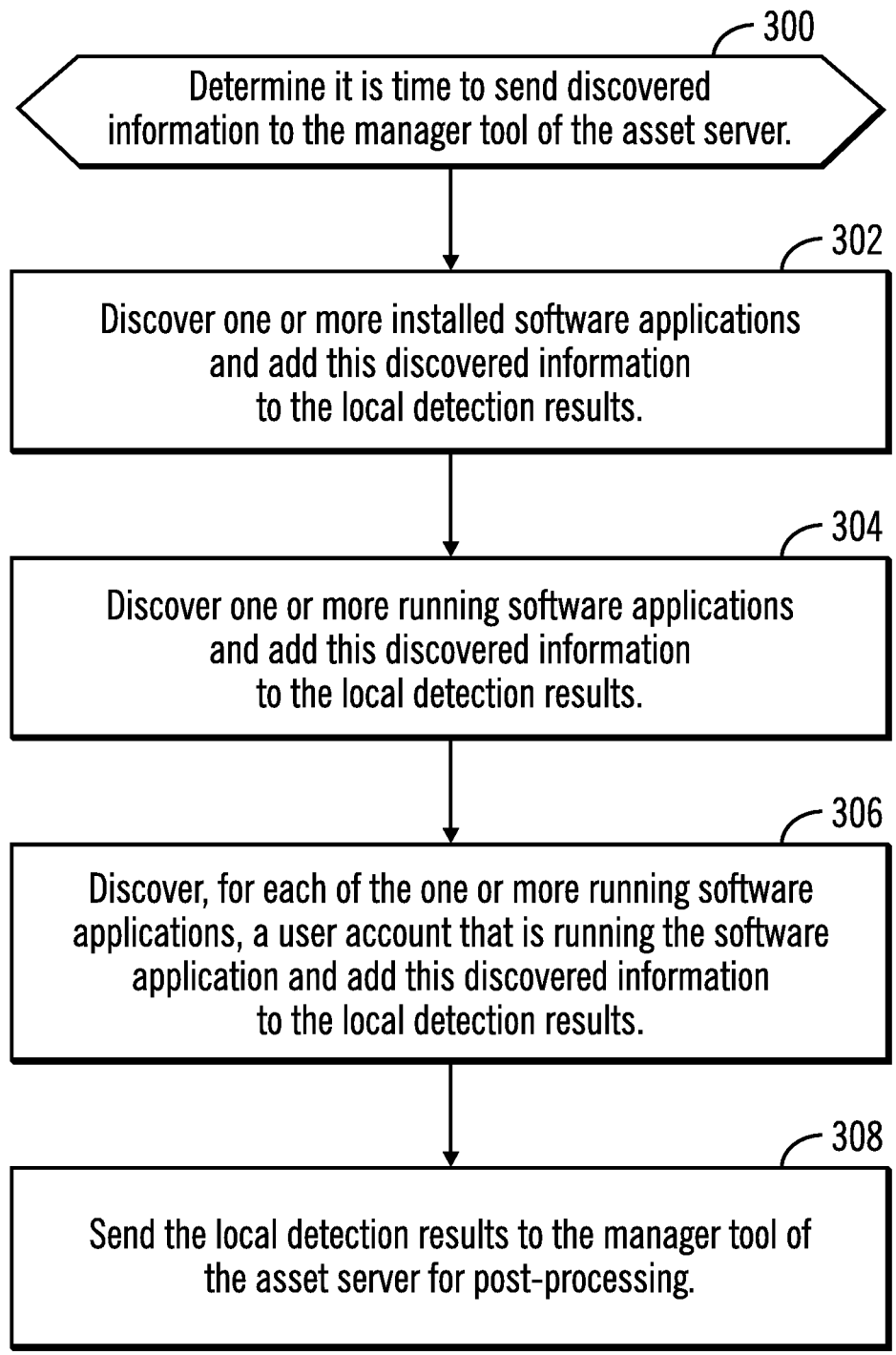
FIG. 3 illustrates, in a flowchart, operations performed by a scanner at an end user computer in accordance with certain embodiments.

FIG. 3 illustrates, in a flowchart, operations performed by a scanner 132b . . . 132p at an end user computer 130b . . . 130p in accordance with certain embodiments. Control begins at block 300 with the scanner 132b . . . 132p determining it is time to send discovered information to the manager tool 110 of the asset server 100. In certain embodiments, the scanner 132b . . . 132p makes the determination in response to receiving a request for the local detection results 134b . . . 134p. In other embodiments, the scanner 132b . . . 132p periodically sends the local detection results 134b . . . 134p to the manager tool 110 of the asset server 100.

In block 302, the scanner 132b . . . 132p discovers one or more installed software applications and adds this discovered information (i.e., names and versions of the one or more installed software applications) to the local detection results 134b . . . 134p. In particular, the scanner 132b . . . 132p discovers the name and version of each of the installed software applications.

In block 304, the scanner 132b . . . 132p discovers one or more running software applications and adds this discovered information (i.e., names and versions of the one or more running software applications) to the local detection results 134b . . . 134p. In particular, the scanner 132b . . . 132p discovers the name and version of each of the running software applications.

In block 306, for each of the one or more running software applications, the scanner 132b . . . 132p discovers a user account that is running the software application and adds this discovered information (i.e., the user account) to the local detection results 134b . . . 134p. In certain embodiments, the user account includes the user name.

In block 308, the scanner 132b . . . 132p sends (e.g., uploads) the local detection results 134b . . . 134p (containing the discovered information) to the manager tool 110 of the asset server 100 for post-process.

With embodiments, each of the end user computers 130b . . . 130p or some subset of the end user computers 130b . . . 130p performs the processing of FIG. 3.

Figure 4A:
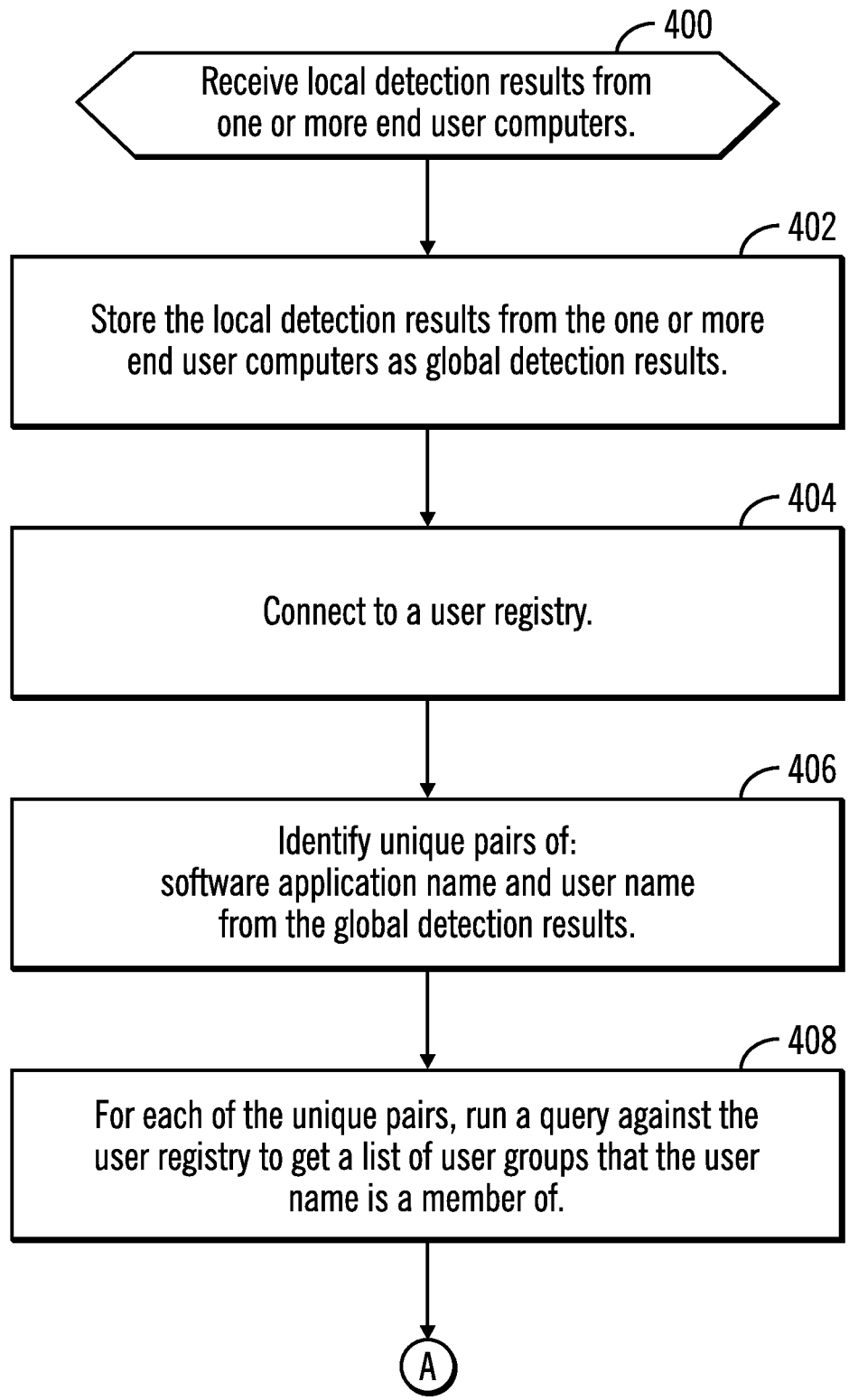
FIGS. 4A and 4B illustrate, in a flowchart, operations performed by a manager tool of an asset server in accordance with certain embodiments.
Figure 4B:
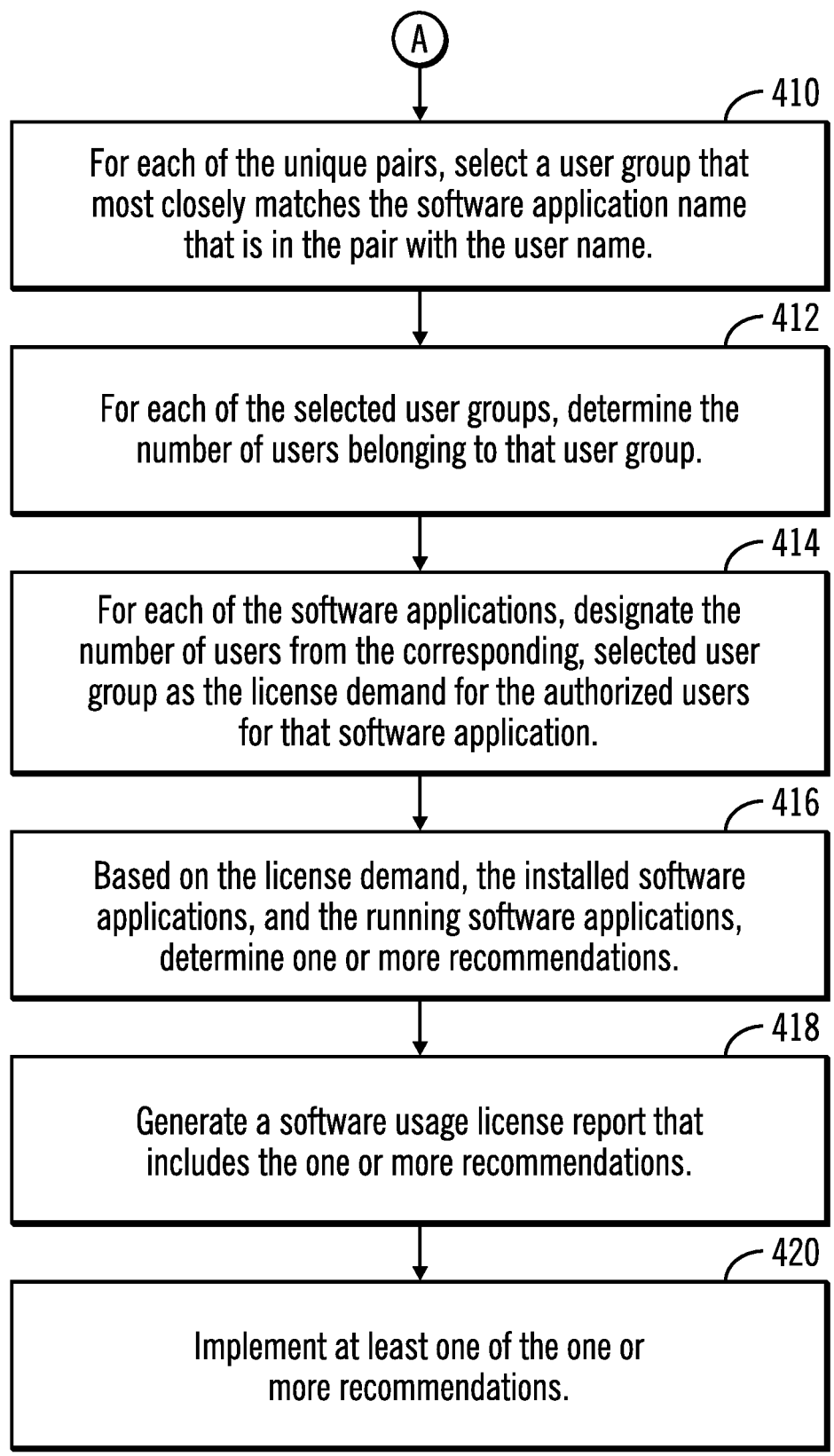

FIGS. 4A and 4B illustrate, in a flowchart, operations performed by the manager tool 110 of the asset server 100 in accordance with certain embodiments. Control begins at block 400 with the manager tool 110 receiving local detection results 134b . . . 134p from one or more end user computers 130b . . . 130p. In certain embodiments, the manager tool 110 sends a request for the local detection results 134b . . . 134p t one or more of the end user computers 130b . . . 130p. In other embodiments, the scanner 132b . . . 132p periodically sends the local detection results 134b . . . 134p to the manager tool 110 of the asset server 100.

In block 402, the manager tool 110 stores the local detection results 134b . . . 134p from the one or more end user computers 130b . . . 130p as global detection results 112.

In block 404, the manager tool 110 connects to a user registry 144. In certain embodiments, connecting means to establish a network connection between the manager tool 100 and the user registry 144, so that queries (i.e., remote queries) may be sent in block 408.

In block 406, the manager tool 110 identifies unique pairs of: software application name and user name from the global detection results 112.

In block 408, for each of the unique pairs, the manager tool 110 runs a query against the user registry 144 to get a list of user groups that the user name is a member of. In certain embodiments, the query includes the user name. From block 408 (FIG. 4A), processing continues to block 410 (FIG. 4B).

In block 410, for each of the unique pairs, the manager tool 110 selects a user group that most closely matches (i.e., corresponds to) the software application name that is in the pair with the user name. In certain embodiments, the manager tool 110 uses the following criteria to select the user group:

If the user belongs to a single user group, then select that user group, otherwise, if the user group contains the application name, then that user group is selected, otherwise, if any of the user group contains a pre-determined list of tokens (e.g., 'software', 'application', 'license'), then compute the difference via string comparison between string values of 'application name' and 'user group name', and select the closest match.

In block 412, for each of the selected user groups, the manager tool 110 determines the number of users belonging to that user group. In block 414, for each of the software applications, the manager tool 110 designates the number of users from the corresponding, selected user group as the license demand for the authorized users for that software application.

In block 416, based on the license demand, the installed software applications, and the running software applications, the manager tool 110 determines one or more recommendations.

In block 418, the manager tool 110 generates a software usage license report 114a . . . 114n that includes the one or more recommendations. The software usage license report 114a may indicate that there are 10 available licenses for the spreadsheet software application, 11 users in user group B use the spreadsheet software application, and the recommendation is to obtain one more license for the spreadsheet software application.

In block 420, the manager tool 110 implements at least one of the one or more recommendations. For example, the manager tool 110 may perform any combination of the following: optimize the user group membership to remove users from user groups who do not use the software application, transfer a license from one user who is not running the software application to another user who does run that software application, purchase additional software application licenses, and/or renew fewer licenses (e.g., to save money if fewer users are running those software applications).

Figure 5:
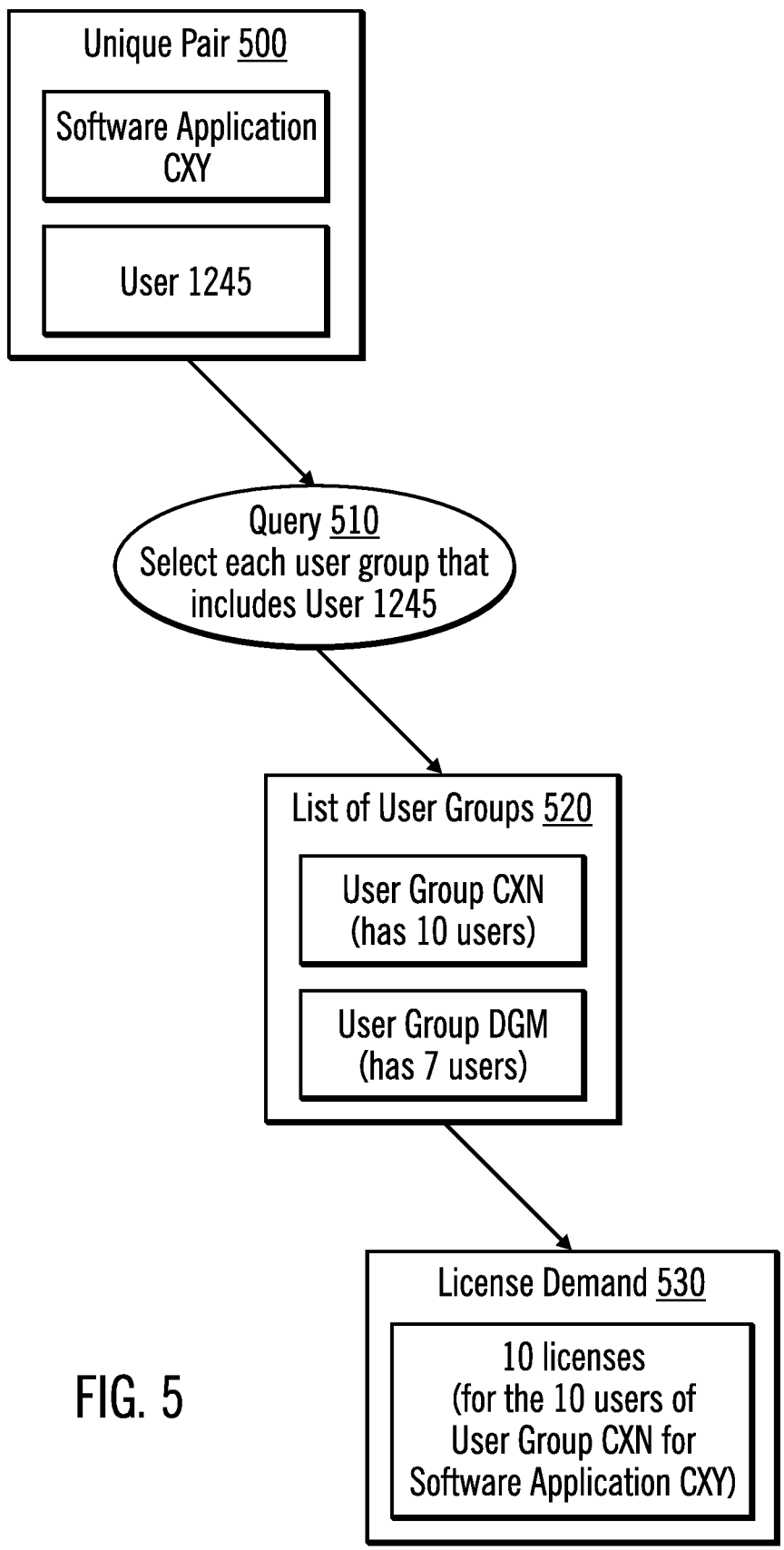
FIG. 5 illustrates an example of determining license demand in accordance with certain embodiments.

FIG. 5 illustrates an example of determining license demand in accordance with certain embodiments. In this example, the unique pair 500 is: Software Application CXY and User 1245. A query 510 is issued against a user registry 144 to select each user group that includes User 1245. The result of the query is a list of user groups 520, which includes: User Group CXN (which has 10 users) and User Group DGM (which has 7 users). For Software Application CXY, the closest user group name is User Group CXN. In this example, the license demand 530 is 10 licenses for the 10 users (i.e., authorized users) of User Group CXN for Software Application CXY. In this example, if fewer than 10 licenses are available for Software Application CXY, then a recommendation may be to obtain more licenses and this recommendation may be implemented. In this example, if more than 10 licenses are available for Software Application CXY, then a recommendation may be to renew with fewer licenses and this recommendation may be implemented.

Certain embodiments provide a preliminary list of users that had access to and/or can run the software application, and this preliminary list of users may be used for verification and counting purposes using a user registry having users in groups.

Embodiments count software application license usage for authorized users based on selected one or more user group memberships. In certain embodiments, the manage tool 110 receives information of installed and running software applications (e.g., application name, version, etc.) and user accounts (that indicate who is running the software applications). The manager tool 110 retrieves user group memberships from the user registry 144 by executing a query that specifies a user name in a unique pair (of software name and user name) to retrieve user groups with that user name. Then, the manager tool 110 selects at least one user group membership by comparing one or more of the software application name tokens/lexicon/strings with the user group name and retrieves a list of users in the selected user group for counting the total number of users using the software license for the software application.

Embodiments provide the number of authorized users for multi-access type of software applications. These are software applications that are stored on a server (not on a laptop or desktop) for multi-user access via remote access. Remote access indicates that either the users are logging into the software application using some form of user registry or via a remote terminal technology.

Embodiments discover the relationship between the running software applications and the list of users who are allowed to use the software applications to compute the license demand expressed by the number of users.

In enterprise software licensing, it is common to license software applications by the number of users who may potentially use the software application. On the other hand, embodiments determine licensing of software applications by the number of users who actually use the software applications. In particular, embodiments back-trace the user group name in a user registry from a single observed user who has installed or is running the software application. In the other words, embodiments observer the software application that is installed or running and look to who is currently logged into the end user computer 130*b* . . . 130*p*. Based on that user, embodiments find the user group for that user in a user registry, and determine that the users in that user group are authorized users for the software application.

Figure 6:
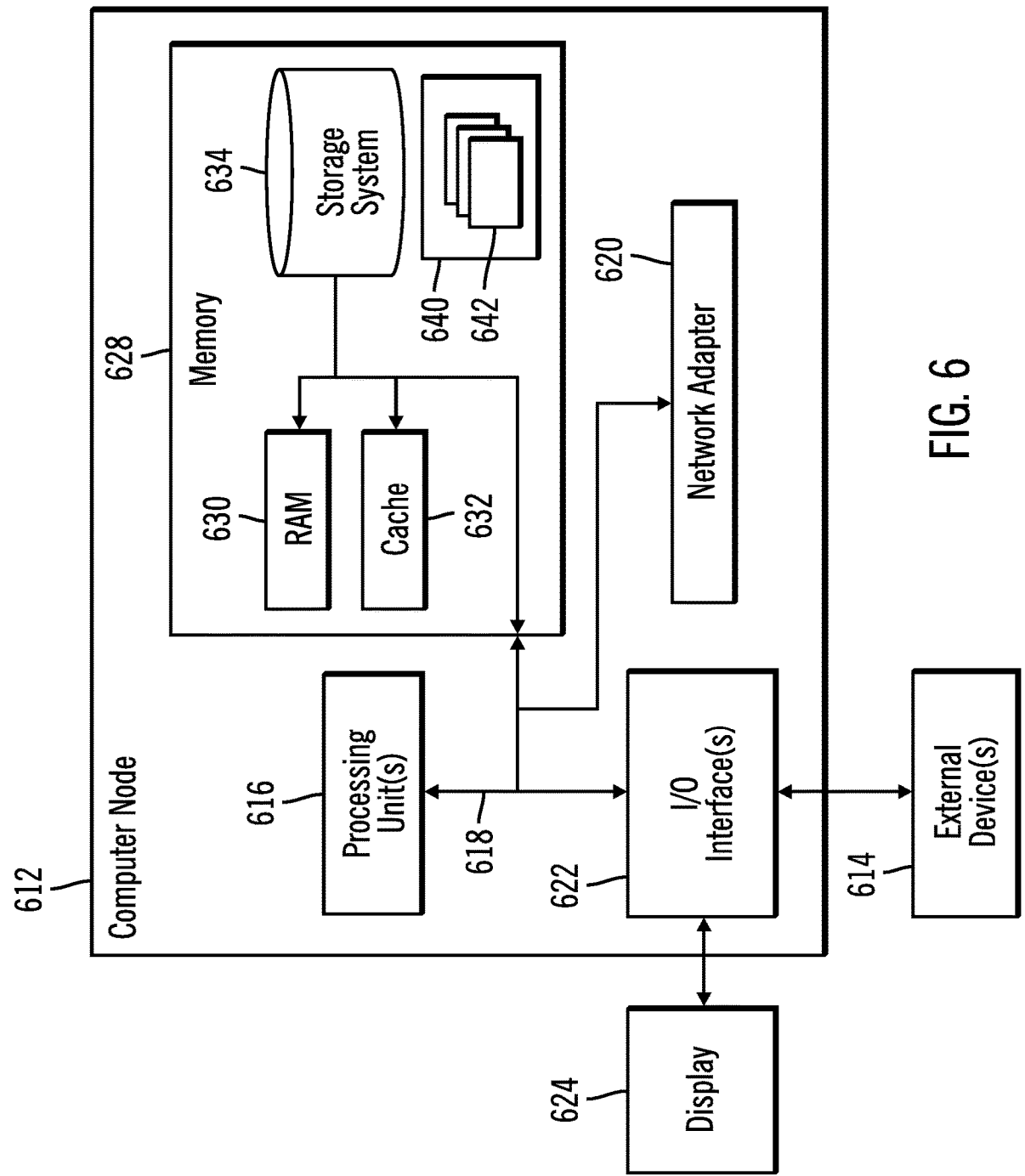
FIG. 6 illustrates a computing environment in accordance with certain embodiments.

FIG. 6 illustrates a computing environment in accordance with certain embodiments. Referring to FIG. 6, computer system 612 is only one example of a suitable computing system and is not intended to suggest any limitation as to the scope of use or functionality of embodiments of the invention described herein. Regardless, computer system 612 is capable of being implemented and/or performing any of the functionality set forth hereinabove.

The computer system 612 may be a computer system, which is operational with numerous other general purpose or special purpose computing system environments or configurations. Examples of well-known computing systems, environments, and/or configurations that may be suitable for use with computer system 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 612 typically includes a variety of computer system readable media. Such media may be any available media that is accessible by computer system 612, and it includes both volatile and non-volatile media, removable and non-removable media.

System memory 628 can include computer system readable media in the form of volatile memory, such as random access memory (RAM) 630 and/or cache memory 632. Computer system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via Input/Output (I/O) interfaces 622. Still yet, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

In certain embodiments, the asset server 100, each end user computer 130b . . . 130p, and the central server 150 has the architecture of computer system 612.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   storing global detection results that indicate, for each of a plurality of end user computers, one or more installed software applications, one or more running software applications, and a user account that is executing each of the running software applications;
   identifying unique pairs using the global detection results, wherein each pair of the unique pairs comprises a software application name for a software application and a user name for a user;
   in response to identifying the unique pairs:
      for each pair of the unique pairs, running a query against a user registry to get a list of user groups that the user name is a member of, wherein the query comprises the user name;
      for each pair of the unique pairs, selecting a user group from the list of user groups for that unique pair that corresponds to the software application name by selecting the user group that matches the software application name of the software application that is in that unique pair with the user name; and
      for each selected user group, designating a number of users in the selected user group as a license demand for authorized users for the software application; and
   based on the global detection results and the license demand, providing one or more recommendations.

2. The computer-implemented method of claim 1, further comprising operations for:
   implementing at least one of the one or more recommendations.

3. The computer-implemented method of claim 1, further comprising operations for:
   receiving local detection results from one or more end user computers; and
   storing the local detection results as the global detection results.

4. The computer-implemented method of claim 1, further comprising operations for:
   generating a software usage license report that includes the one or more recommendations, the license demand, the software application name, and the authorized users.

5. The computer-implemented method of claim 1, wherein an end user computer generates local detection results and forwards them for generating the global detection results.

6. The computer-implemented method of claim 1, wherein the software application comprises a multi-user access software application stored on a central server for access by multiple users at different end user computers.

7. A computer program product, the computer program product comprising a computer readable storage medium having program code embodied therewith, the program code when executed by at least one processor to perform operations for:
   storing global detection results that indicate, for each of a plurality of end user computers, one or more installed software applications, one or more running software applications, and a user account that is executing each of the running software applications;
   identifying unique pairs using the global detection results, wherein each pair of the unique pairs comprises a software application name for a software application and a user name for a user;

in response to identifying the unique pairs:

for each pair of the unique pairs, running a query against a user registry to get a list of user groups that the user name is a member of, wherein the query comprises the user name;

for each pair of the unique pairs, selecting a user group from the list of user groups for that unique pair that corresponds to the software application name by selecting the user group that matches the software application name of the software application that is in that unique pair with the user name; and for each selected user group, designating a number of users in the selected user group as a license demand for authorized users for the software application; and based on the global detection results and the license demand, providing one or more recommendations.

8. The computer program product of claim 7, wherein the program code is when executed by the at least one processor to perform further operations for:

implementing at least one of the one or more recommendations.

9. The computer program product of claim 7, wherein the program code is when executed by the at least one processor to perform further operations for:

receiving local detection results from one or more end user computers; and storing the local detection results as the global detection results.

10. The computer program product of claim 7, wherein the program code is when executed by the at least one processor to perform further operations for:

generating a software usage license report that includes the one or more recommendations, the license demand, the software application name, and the authorized users.

11. The computer program product of claim 7, wherein an end user computer generates local detection results and forwards them for generating the global detection results.

12. The computer program product of claim 7, wherein the software application comprises a multi-user access software application stored on a central server for access by multiple users at different end user computers.

13. A computer system, comprising:

one or more processors, one or more computer-readable memories and one or more computer-readable, tangible storage devices; and program instructions, stored on at least one of the one or more computer-readable, tangible storage devices when executed by at least one of the one or more processors via at least one of the one or more computer-readable memories, to perform operations comprising:

storing global detection results that indicate, for each of a plurality of end user computers, one or more installed software applications, one or more running software applications, and a user account that is executing each of the running software applications;

identifying unique pairs using the global detection results, wherein each pair of the unique pairs comprises a software application name for a software application and a user name for a user;

in response to identifying the unique pairs:

for each pair of the unique pairs, running a query against a user registry to get a list of user groups that the user name is a member of, wherein the query comprises the user name;

for each pair of the unique pairs, selecting a user group from the list of user groups for that unique pair that corresponds to the software application name by selecting the user group that matches the software application name of the software application that is in that unique pair with the user name; and for each selected user group, designating a number of users in the selected user group as a license demand for authorized users for the software application; and based on the global detection results and the license demand, providing one or more recommendations.

14. The computer system of claim 13, wherein the operations further comprise:

implementing at least one of the one or more recommendations.

15. The computer system of claim 13, wherein the operations further comprise:

receiving local detection results from one or more end user computers; and storing the local detection results as the global detection results.

16. The computer system of claim 13, wherein the operations further comprise:

generating a software usage license report that includes the one or more recommendations, the license demand, the software application name, and the authorized users.

17. The computer system of claim 13, wherein an end user computer generates local detection results and forwards them for generating the global detection results.

18. The computer system of claim 13, wherein the software application comprises a multi-user access software application stored on a central server for access by multiple users at different end user computers.

* * * * *